(12) United States Patent
Vasseur et al.

(10) Patent No.: US 12,095,650 B2
(45) Date of Patent: Sep. 17, 2024

(54) USING DISCRETIZED STATE-TRANSITIONS TO EXPLAIN AND TROUBLESHOOT APPLICATION EXPERIENCE DEGRADATION IN PREDICTIVE INTERNET

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/382,469

(22) Filed: Jul. 22, 2021

(65) Prior Publication Data

US 2023/0027969 A1 Jan. 26, 2023

(51) Int. Cl.
| | |
|---|---|
| *H04L 45/12* | (2022.01) |
| *H04L 43/0829* | (2022.01) |
| *H04L 43/087* | (2022.01) |
| *H04L 43/0888* | (2022.01) |
| *H04L 45/02* | (2022.01) |
| *H04L 45/42* | (2022.01) |
| *H04L 45/50* | (2022.01) |

(52) U.S. Cl.
CPC ........ *H04L 45/123* (2013.01); *H04L 43/0829* (2013.01); *H04L 43/087* (2013.01); *H04L 43/0888* (2013.01); *H04L 45/02* (2013.01); *H04L 45/42* (2013.01); *H04L 45/507* (2013.01)

(58) Field of Classification Search
CPC . H04L 45/123; H04L 43/0829; H04L 43/087; H04L 43/0888; H04L 45/02; H04L 4/42; H04L 45/507
USPC .......................................................... 709/238
See application file for complete search history.

(56) References Cited

U.S. PATENT DOCUMENTS

| | | | |
|---|---|---|---|
| 7,472,183 B1 | 12/2008 | Dini et al. | |
| 9,876,673 B2 | 1/2018 | Margalit et al. | |
| 10,938,699 B1 | 3/2021 | Berman et al. | |
| 2008/0123546 A1* | 5/2008 | Isono | H04M 1/2535 370/252 |
| 2016/0344599 A1 | 11/2016 | Porter et al. | |
| 2017/0075693 A1* | 3/2017 | Bishop | G06F 9/4881 |
| 2019/0340304 A1* | 11/2019 | Bak | G06F 16/904 |
| 2020/0084293 A1 | 3/2020 | Chatterjee | |

(Continued)

OTHER PUBLICATIONS

"Parallel Categories Diagram in Python", online: https://plotly.com/python/parallel-categories-diagram/, accessed Jul. 19, 2021, 14 pages, Plotly.com.

(Continued)

*Primary Examiner* — Hermon Asres
(74) *Attorney, Agent, or Firm* — BEHMKE INNOVATION GROUP LLC; James M. Behmke; James J. Wong

(57) ABSTRACT

In one embodiment, a device obtains path metrics for a network path used to convey application traffic for an online application. The device discretizes the path metrics into labeled states. The device generates state transition visualization data that represents the labeled states as nodes and transitions between the labeled states as edges connecting the nodes. The device provides the state transition visualization data for display.

18 Claims, 15 Drawing Sheets

(56) References Cited

U.S. PATENT DOCUMENTS

2020/0296011 A1* 9/2020 Jain ...................... H04L 43/026
2020/0367129 A1* 11/2020 Raheem .............. G06F 16/9024

OTHER PUBLICATIONS

"Sankey Diagram", online: https://en.wikipedia.org/wiki/Sankey_diagram, Jul. 12, 2021, 2 pages, Wikimedia Foundation, Inc.

* cited by examiner

USING DISCRETIZED STATE-TRANSITIONS TO EXPLAIN AND TROUBLESHOOT APPLICATION EXPERIENCE DEGRADATION IN PREDICTIVE INTERNET

TECHNICAL FIELD

The present disclosure relates generally to computer networks, and, more particularly, to using discretized state-transitions to explain and troubleshoot application experience degradation in predictive Internet.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. While configuring a predictive routing engine that relies on the detection of seasonal patterns is relatively straightforward, it is much more challenging to identify precursor network states and state transitions that serve as early warning signs of degraded application experience metrics. Further, if detected, these states and state transitions could also provide valuable insights to a network administrator seeking to better understand the degraded application experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
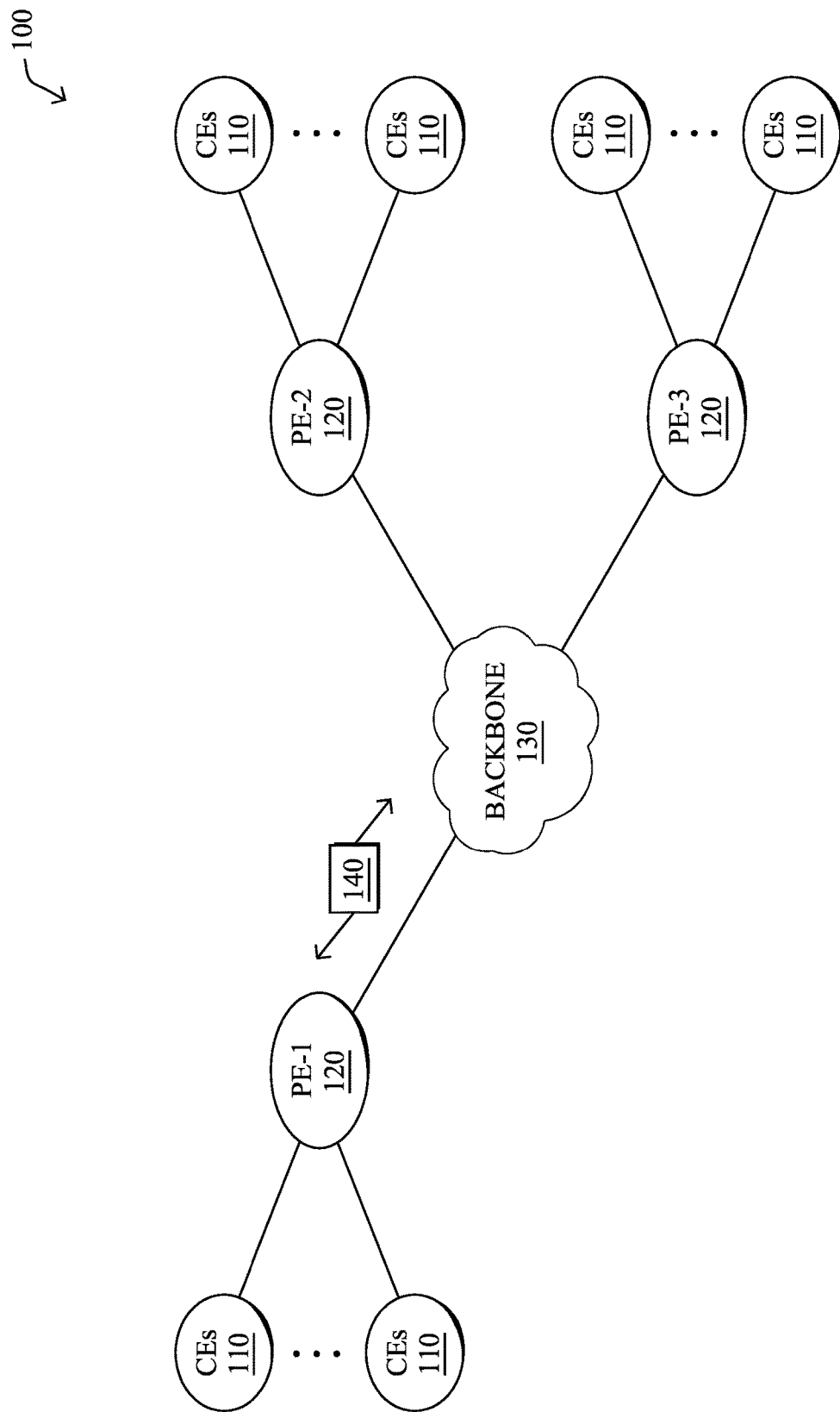
FIGS. 1A-1B illustrate an example communication network.

According to one or more embodiments of the disclosure, a device obtains path metrics for a network path used to convey application traffic for an online application. The device discretizes the path metrics into labeled states. The device generates state transition visualization data that represents the labeled states as nodes and transitions between the labeled states as edges connecting the nodes. The device provides the state transition visualization data for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
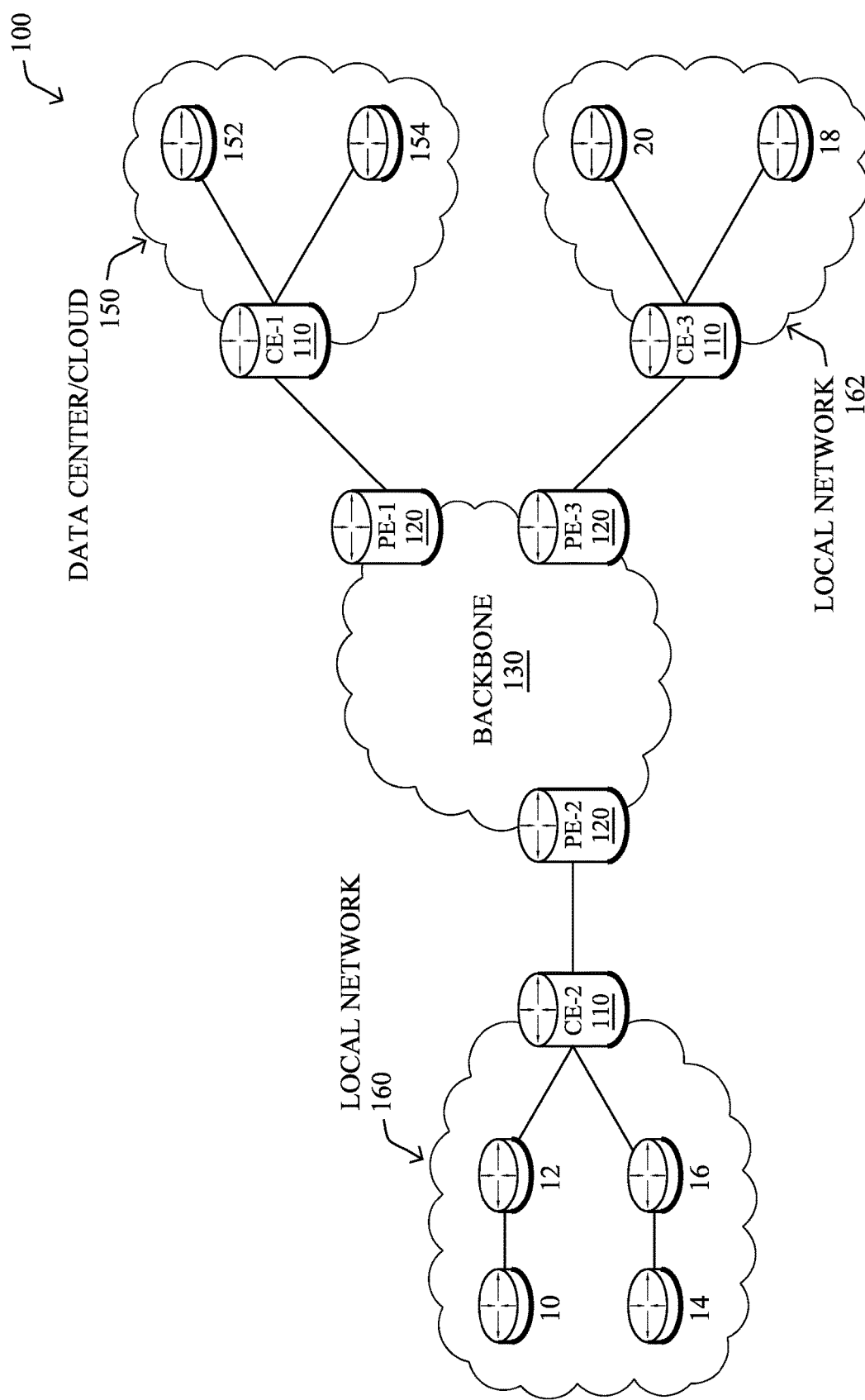

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
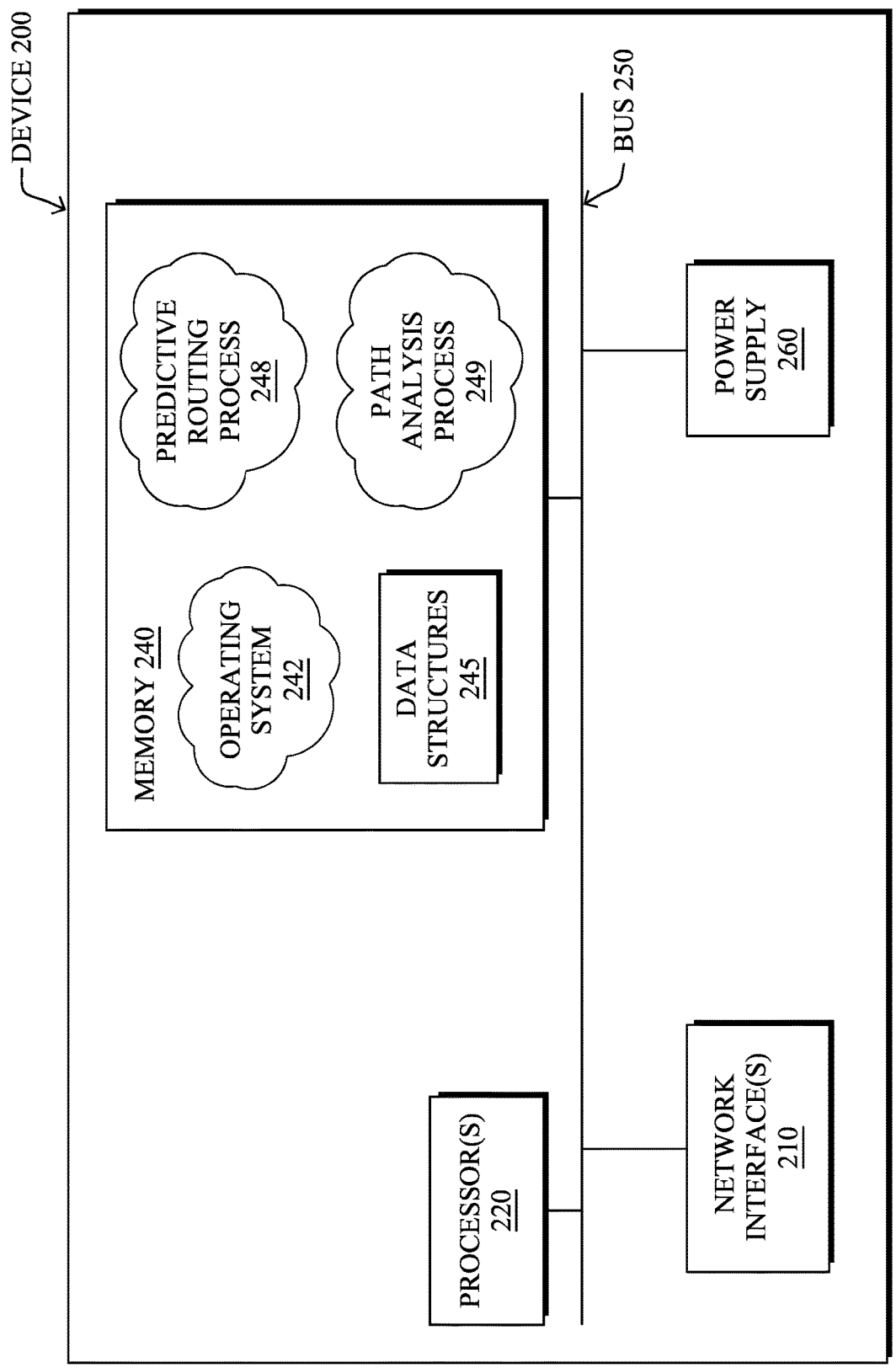
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a path analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a path analysis process 249 may include computer executable instructions that, when executed by processor(s) 220, cause device 200 to perform the techniques described herein. To do so, in some embodiments, predictive routing process 248 and/or a path analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a path analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a path analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
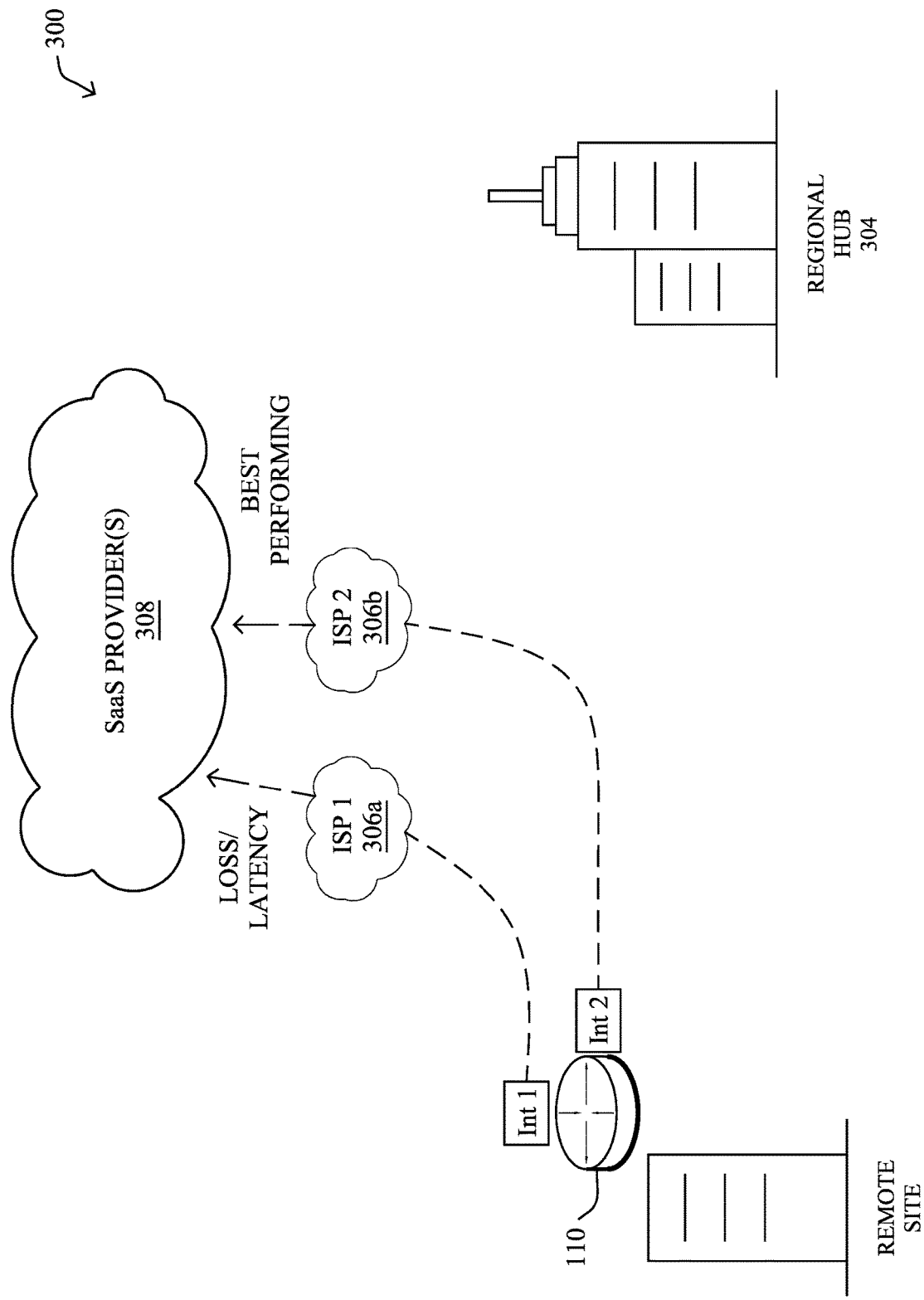
FIGS. 3A-3B illustrate example network deployments.
Figure 3B:
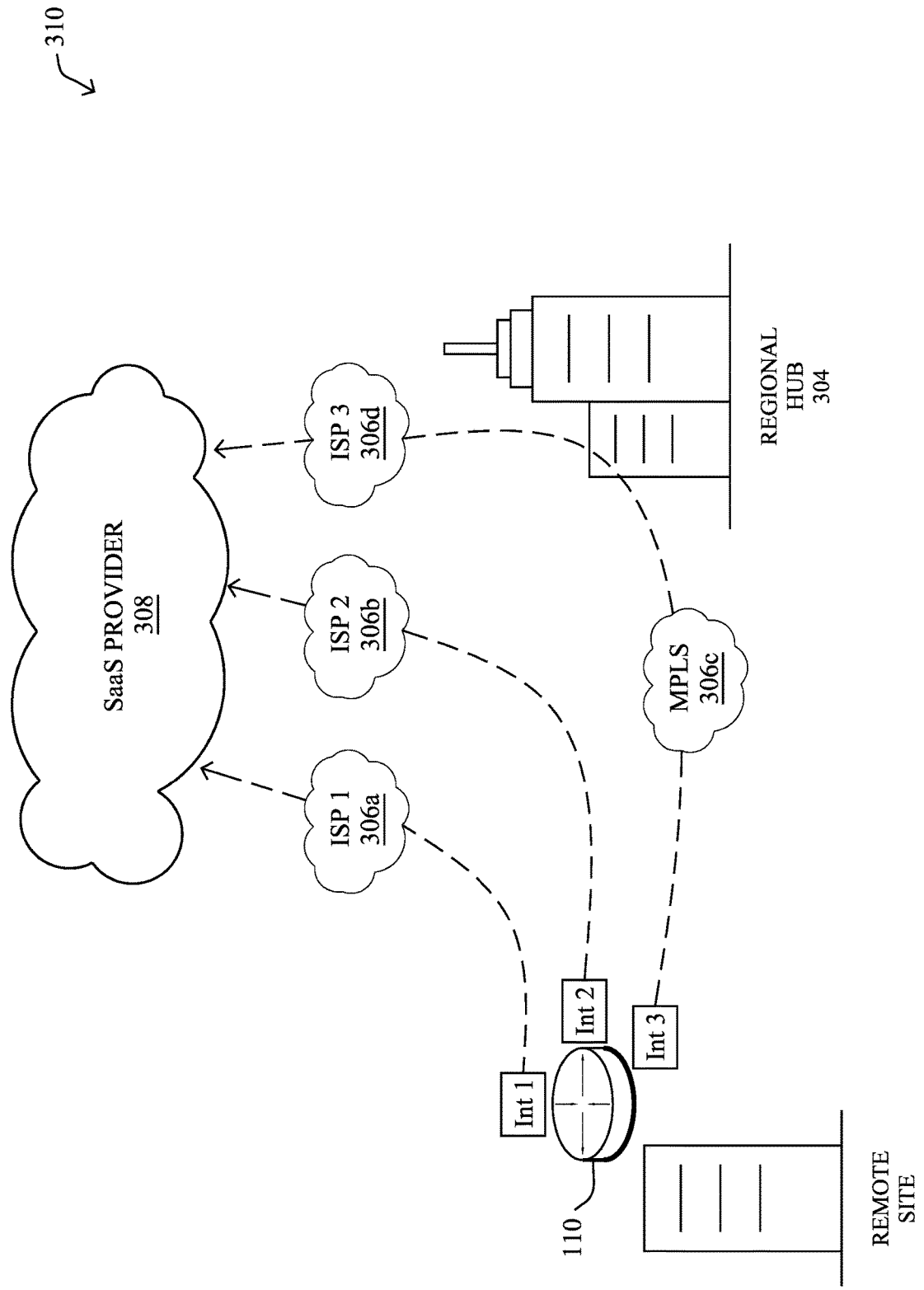

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
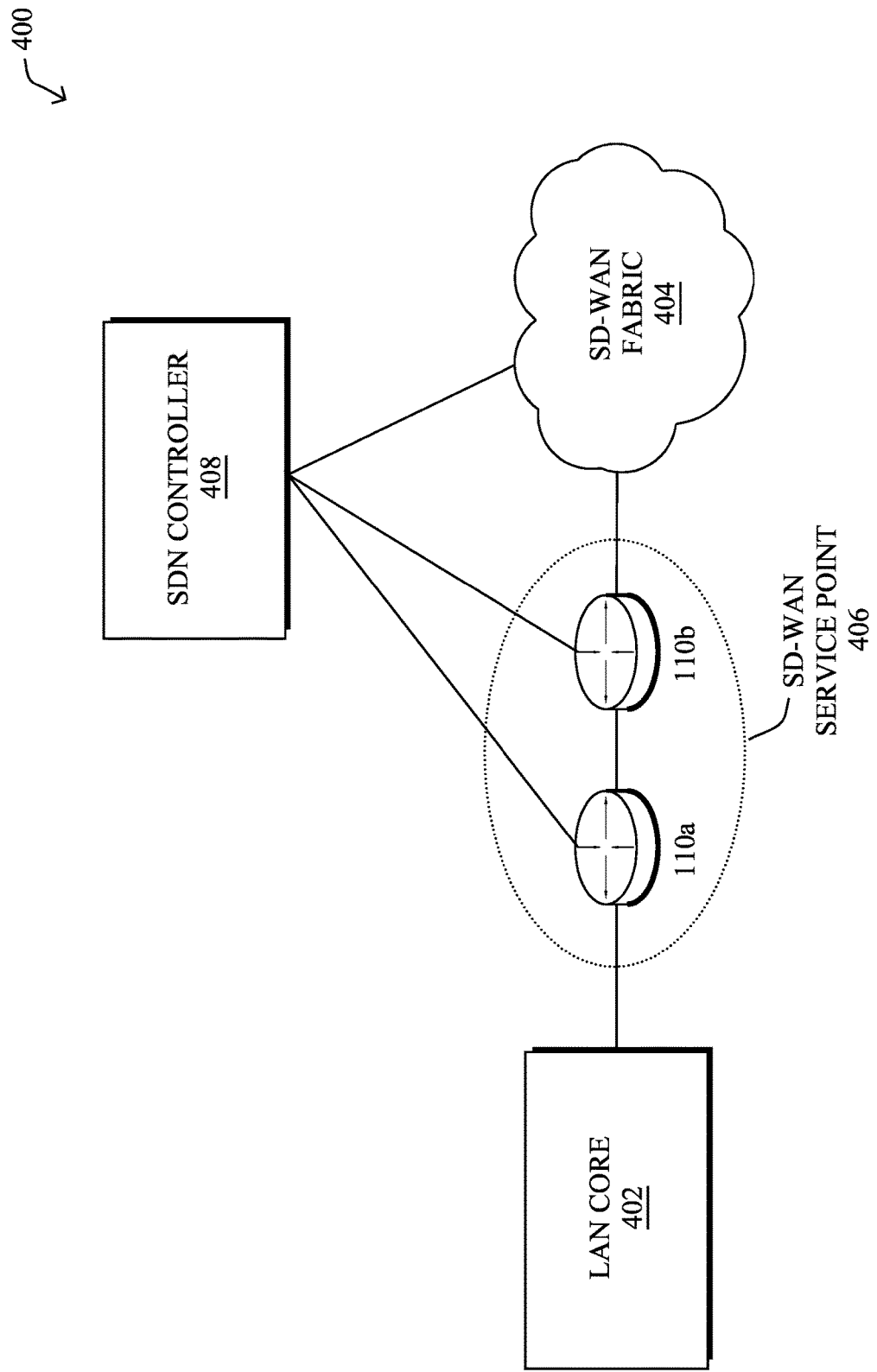
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
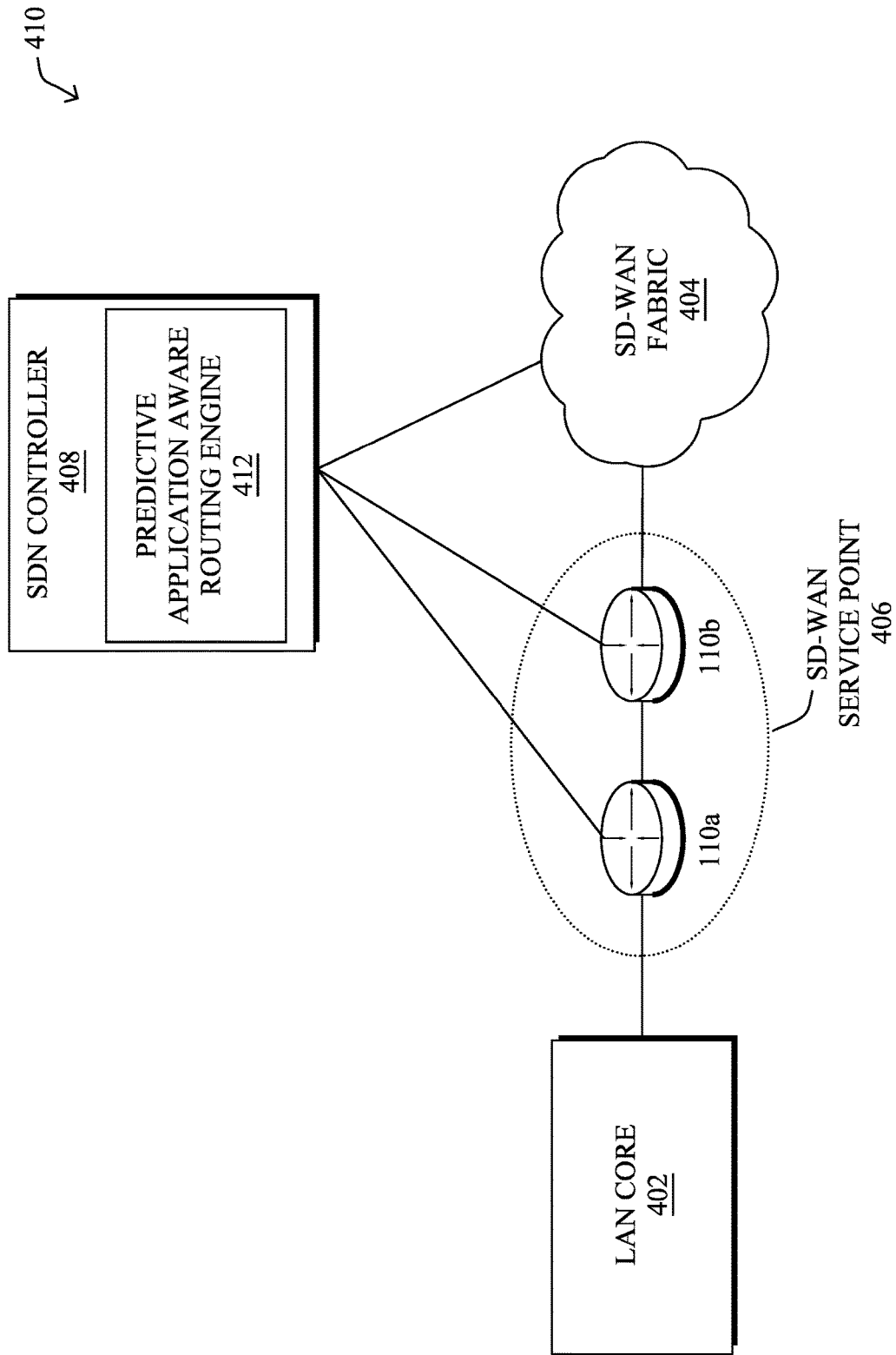

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive routing systems, such as predictive application aware routing engine 412, monitor path QoS metrics, such as loss and latency, and application-experience metrics along multiple paths, to predict and steer traffic via paths that provide the best application experience. One of the main components of such a predictive routing system is to forecast the application experience and QoS along paths. What has been observed so far is that predictive engines may be capable of detecting seasonal SLA violation and, rarely, early signs predictive of SLA violations. To that end, detecting early signs of path-degradation is essential so that an alarm can be raised before the path goes bad.

Identifying early signs of path degradation is challenging since path quality for an application is a function of multiple features such as QoS metrics and number of sessions. Traditionally, a simple threshold-based SLA templates are used to quantify if the path is bad (e.g., voice application should meet constraints of loss<3%, jitter<50 ms, and round-trip-latency<300 ms). However, to detect early signs of going bad, the main question to answer is: how did the path reach the bad state? The path might have early signs such as small fluctuations in jitter, oscillations of spikes in queue drops, or slowly rising loss. Current approaches do not identify and utilize such early signs. Not capturing early signs leads to possible inferior forecasting models, since early sign features are not provided to the model, and also for a non-interpretable model which cannot explain how the path went bad.

——Using Discretized State-Transitions to Explain & Troubleshoot Application Experience Degradation in Predictive Internet——

The techniques introduced herein allow for the display of a sequence of events with predictive power using path-states that provide early signs for bad application experience. Such states may be determined by learning over multiple path features (e.g., QoS metrics and traffic). In further aspects, visualizations can then be sent to a display to show how paths move across interpretable states that lead to bad application experience. In other aspects, the techniques herein also provide for the visualization of interpretable state transitions that lead to bad application experience, and report on why paths see bad experience. This can be used for troubleshooting path behaviors by taking remedial actions to avoid bad states.

Illustratively, the techniques described herein may be performed by hardware, software, and/or firmware, such as in accordance with path analysis process 249, which may include computer executable instructions executed by the processor 220 (or independent processor of interfaces 210) to perform functions relating to the techniques described herein, in conjunction with predictive routing process 248.

Specifically, according to various embodiments, a device obtains path metrics for a network path used to convey application traffic for an online application. The device discretizes the path metrics into labeled states. The device generates state transition visualization data that represents the labeled states as nodes and transitions between the labeled states as edges connecting the nodes. The device provides the state transition visualization data for display.

Figure 5:
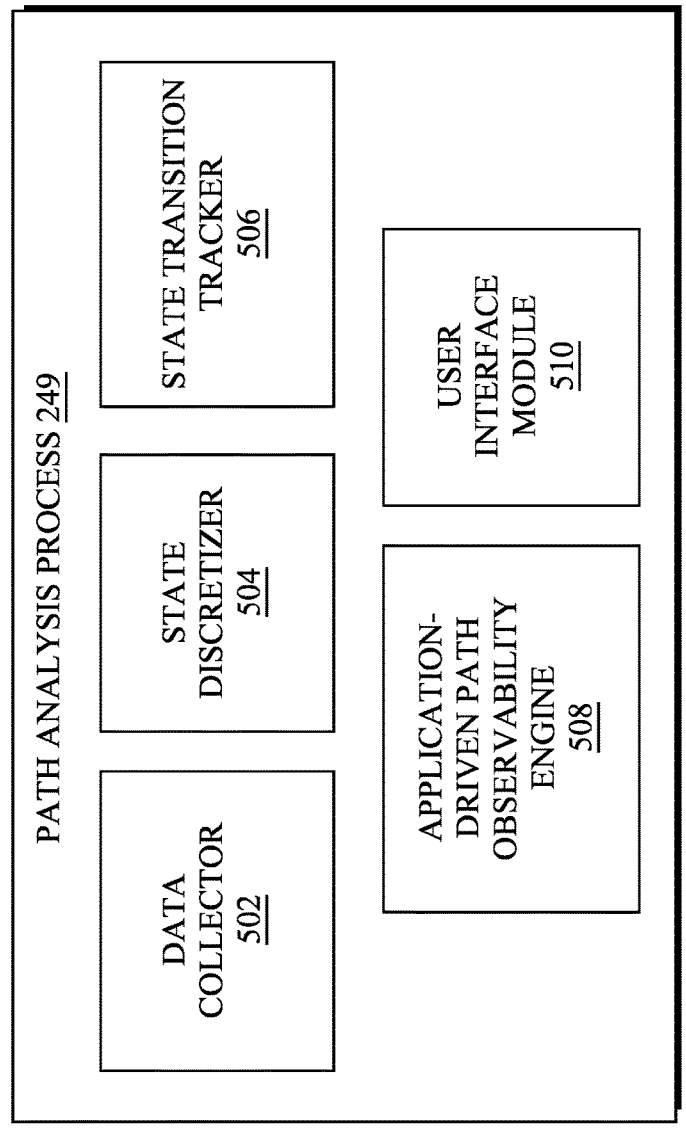
FIG. 5 illustrates an example architecture for analyzing a network path.

Operationally, FIG. 5 illustrates an example architecture 500 for analyzing a path, according to various embodiments. At the core of architecture 500 is path analysis process 249, which may be executed by a controller for a network or another device in communication therewith. For instance, path analysis process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, path analysis process 249 may operate in conjunction with a predictive application aware routing engine, such as predictive application aware routing engine 412, or directed implemented as a component thereof, in some embodiments.

As shown, path analysis process 249 may include any or all of the following components: a data collector 502, a state discretizer 504, a state transition tracker 506, an application-driven observability engine 508, and/or a user interface module 510. As would be appreciated, the functionalities of these components may be combined or omitted, as desired. In addition, these components may be implemented on a singular device or in a distributed manner, in which case the combination of executing devices can be viewed as their own singular device for purposes of executing path analysis process 249.

During execution, data collector 502 may be responsible for obtaining network telemetry and application experience metrics associated sessions for an online application. For instance, data collector 502 may obtain any or all of the following, either on a pull or push basis:

Path QoS metrics—e.g., loss, latency, jitter, throughput, etc.

NetFlow records—e.g., telemetry data that summarizes the application sessions that flow over the paths Application experience metrics—these metrics generally represent the degree of satisfaction users of the online application have and may be associated with the path(s) traversed by the application traffic. Such information may be specified by the users of the application, either within the application itself (e.g., an in-application survey) or through other polling mechanisms (e.g., a local agent, email surveys, text message-based surveys, etc.)

Other information—other bookkeeping information such as device geo-locations, system statistics (e.g., CPU usage, memory usage, etc.).

State discretizer 504 may be responsible for analyzing the data collected by data collector 502 and detecting the features and discrete-levels at which the features need to be analyzed, to explain the states of the network. For instance, state discretizer 504 may convert the continuous or discrete information above into "path-states" that represent how the path is performing at that point in time for multiple dimensions.

In one embodiment, state discretizer 504 may collect a timeseries of networking or application key performance indicator (KPI) that describe the path characteristics, such as loss, latency, jitter, bandwidth used, probability of SLA violation for different application classes, number of sessions for different application classes, or the like. State discretizer 504 may then convert the continuous values into symbols that represent the state of each individual point in the timeseries. For example, a continuous timeseries values of jitter [0, 0, 1, 2, 30, 30, 70] ms can be symbolized as [a,a,b,b,c,c,z] where a, b, c and z represents the states 'low,' 'medium,' 'high,' and 'catastrophic' (e.g., SLA violated), respectively. State discretizer 504 may do so using thresholds set by experts, or by dynamically learning the thresholds over time.

In a first embodiment, a user interface will be used to allow an administrator to configure the correspondences between values and states for each relevant KPI (e.g., networking and applications). For instance, state discretizer 504 may interact with user interface module 510, to provide a graphical user interface (GUI) to a device, to allow the administrator to make this configuration.

In a second embodiment, state discretizer 504 may automatically learn the thresholds used to convert the timeseries into symbolic representations using Piecewise Aggregate Approximation (PAA) or other techniques that is capable of computing tags for timeseries values.

Figure 6:
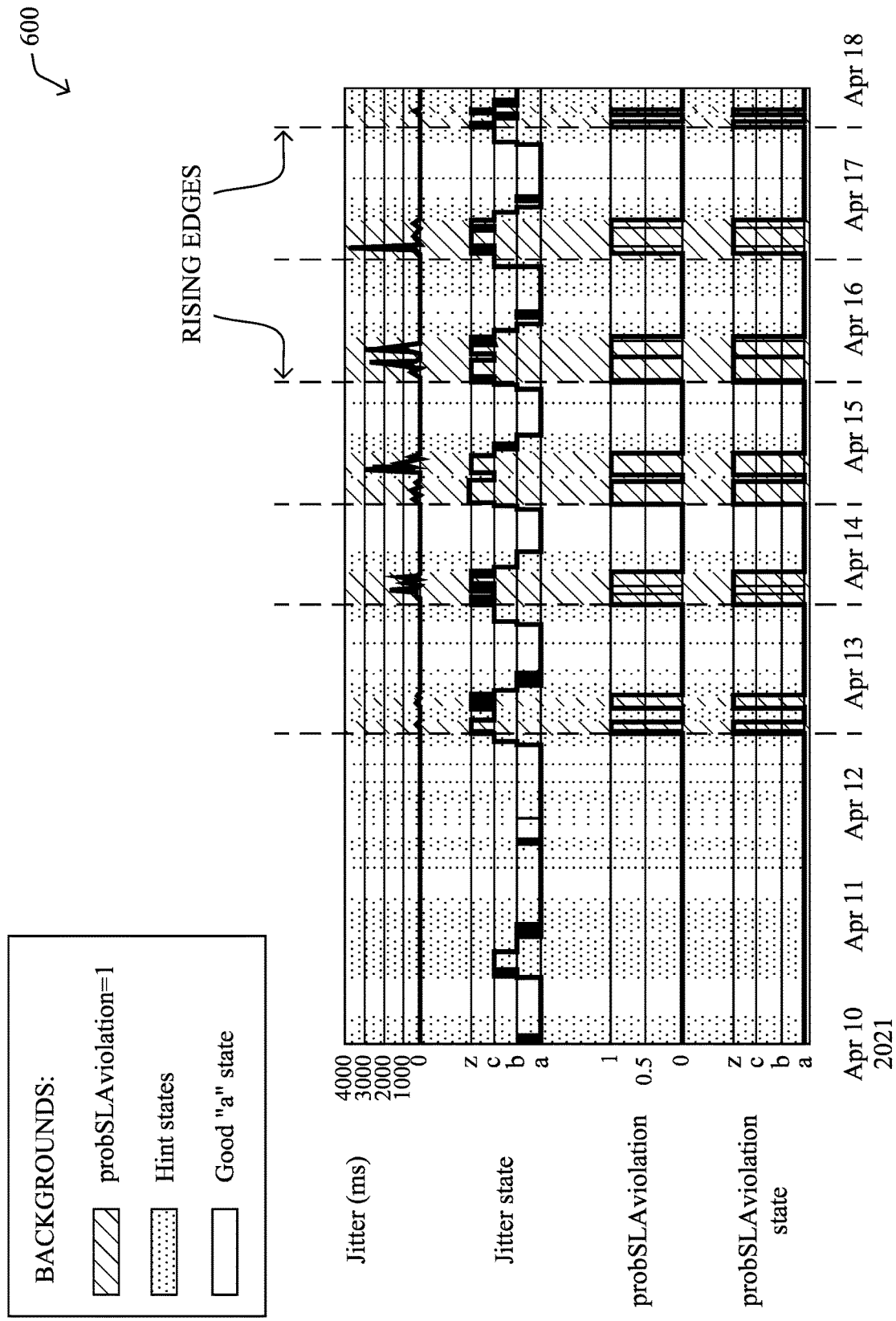
FIG. 6 illustrates an example plot of path metrics.

By way of example, FIG. 6 illustrates an example plot of different timeseries of raw jitter and the probability of an SLA violation (voice), as well as their respective symbolized states using PAA. For instance, the jitter states may be divided by PAA into four possible states, represented by the symbols {z, c, b, a}. Similarly, the probability of an SLA violation can be represented by the symbols {z, c, b, a}.

In plot 600, it can be seen that the measured jitter varies significantly, ranging from 0 ms to 4000 ms. However, the large peaks occur only a small number of times. Smaller variations of jitter, such as 50 ms, which will violate a typical SLA for voice traffic along a network path, will be virtually unnoticed by an end user due to this large variation. The symbolized jitter state captures even such smaller variations under symbols 'b' and 'c.' Also, a special symbol of 'z' is used to represent the jitter state when it violates the SLA threshold (e.g., >50 ms for voice). Note that the probability of an SLA violation occurring is typically binary in nature (e.g., just 0 or 1 for each time window). In such a case, the SLA violation probability states may be represented as either an 'a' for 0 (e.g., no predicted violation) or 'z' for 1 (e.g., a predicted SLA violation). Similarly, other metrics such as loss and latency of the path can also be discretized.

Referring again to FIG. 5, state discretizer 504 may learn the optimal number of discretization symbols, rather than relying on a fixed set of symbols. The timeseries can also be smoothed by state discretizer 504 (e.g., by taking an average over a smaller window for each timeseries point) before converting the time series into symbols, as done symbolizing as usually done in PAA.

In addition to converting univariate variables, such as jitter, into a symbolized state representation, state discretizer 504 may also define the state of the entire path. Note that a network path may be a point-to-point link or a path crossing an entire Autonomous Systems (AS) or even multiple AS. Accordingly, a state of the path can be represented as a function of states of individual univariate variable states.

In one embodiment, state discretizer 504 may define a path state as a concatenation of selected features. For example, the state of a path P can be represented as a 4-tuple stateP=<probSlaViolationState, latencyState, lossState, jitterState>, where each individual state is a symbol from the set {a,b,c,z}. Hence, a state 'aaaa' represents an "all-good" state where loss, latency, jitter and probSlaViolation are low, and the state 'zaaz' represents the state where jitter and probability of SLA violation are bad (e.g., jitter>50 ms and probSlaViolation=1). Note that when the state of probSlaViolation is 'z,' it means that the application experience is poor (SLA violation). This is usually used to indicate an undesirable state.

In other embodiments, state discretizer 504 may assess the true application experience, such as Mean Opinion Score (MOS) of voice traffic. These features may be available in scenarios where the application sends the user experience scores to data collector 502 or data collector 502 is otherwise able to obtain these metrics.

In yet other embodiments, only a selective set of features may be selected for a given path. For example, state discretizer 504 may represent a path where jitter does not vary, but the bandwidth used and number of user voice sessions vary, by the 5-tuple <latencyState, lossState, bandwidthState, numSessionState, probSlaViolationState>. Such varying univariate features can be automatically selected by statistically selecting the features with some/non-zero variance. Two or more states can also be merged if there is a correlation between the states of those variables.

Another potential component of path analysis process 249 is state transition tracker 506, which is responsible for building an interpretable state transition representation that can explain the set of states that a path goes through. For example, state transition tracker 506 may be able to explain how the path moves from a good state to a bad state for a given application.

Figure 7A:
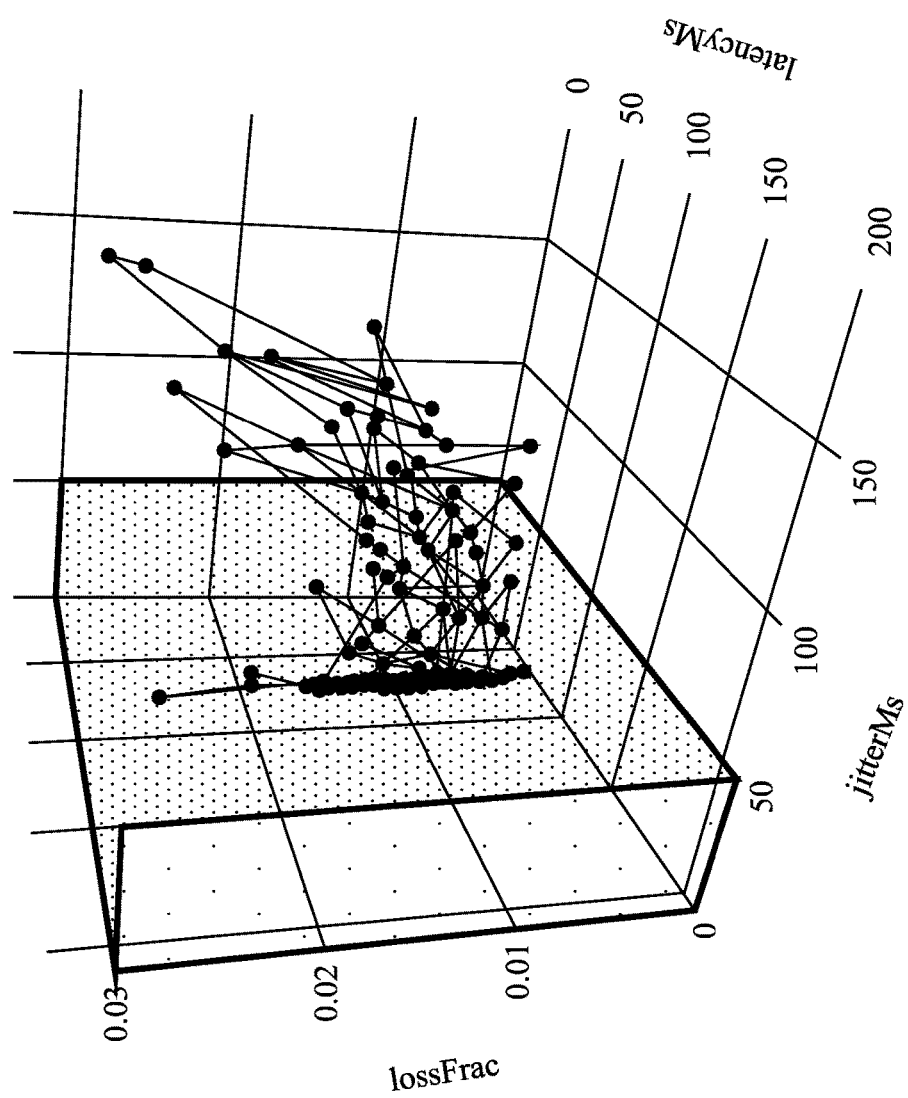
FIGS. 7A-7B illustrate example plots of state transitions.

As time evolves, the path is likely to exhibit different values for its metric variables. Accordingly, the multi-dimensional timeseries of a path may be represented as an n-dimensional cube, in some embodiments. For example, FIG. 7A illustrates an example 3-Dimensional (3D) plot 700 showing the transitions of loss, latency, and jitter values or a path. Each point in plot 700 represents one set of values for the three variables and consecutive values in time are connected by a line. The highlighted box extending from jitter=0 ms to jitter=~50 ms represents the SLA thresholds typically used for voice: loss<3%, latency<300 ms and jitter<50 ms). If a plotted point in plot 700 falls within this box, then the voice quality is assumed to be good for the end user. However, if it goes outside the box, this indicates bad application experience, per the SLA template. Such an n-dimension cube can also be used to study how the state enters a bad state (e.g., outside of the shaded box). For example, in plot 700, it can be seen that usually latency=75 ms, jitter=0ms and loss=[0,1.5]%, resulting in a very dense cluster of points. However, before transitioning to a bad state, it can also be seen that the jitter and latency slowly increases. These indicate the interpretable early signs before entering the bad state. In various embodiments, the system may provide plot 700, or other similar representations, to a display for review by an administrator. Doing so allows the trajectories of the various measurements to provide interpretable, visual analytics so that the administrator can better understand the behavior of the path.

Referring again to FIG. 5, in other embodiments with more than three variables, state transition tracker 506 may select up to three major variables for visualizing. In some embodiments, state transition tracker 506 may use a statistical or machine learning algorithm, to learn which features vary the most or have the highest feature importance. Up to the top three features can be selected. For instance, state transition tracker 506 may leverage Principal Component Analysis (PCA) or t-distributed stochastic neighbor embedding (tSNE) to identify the top three components. While interpreting such abstract components could be more difficult for the administrator, it still remains possible to infer the state dynamics of the system from this information.

Figure 7B:
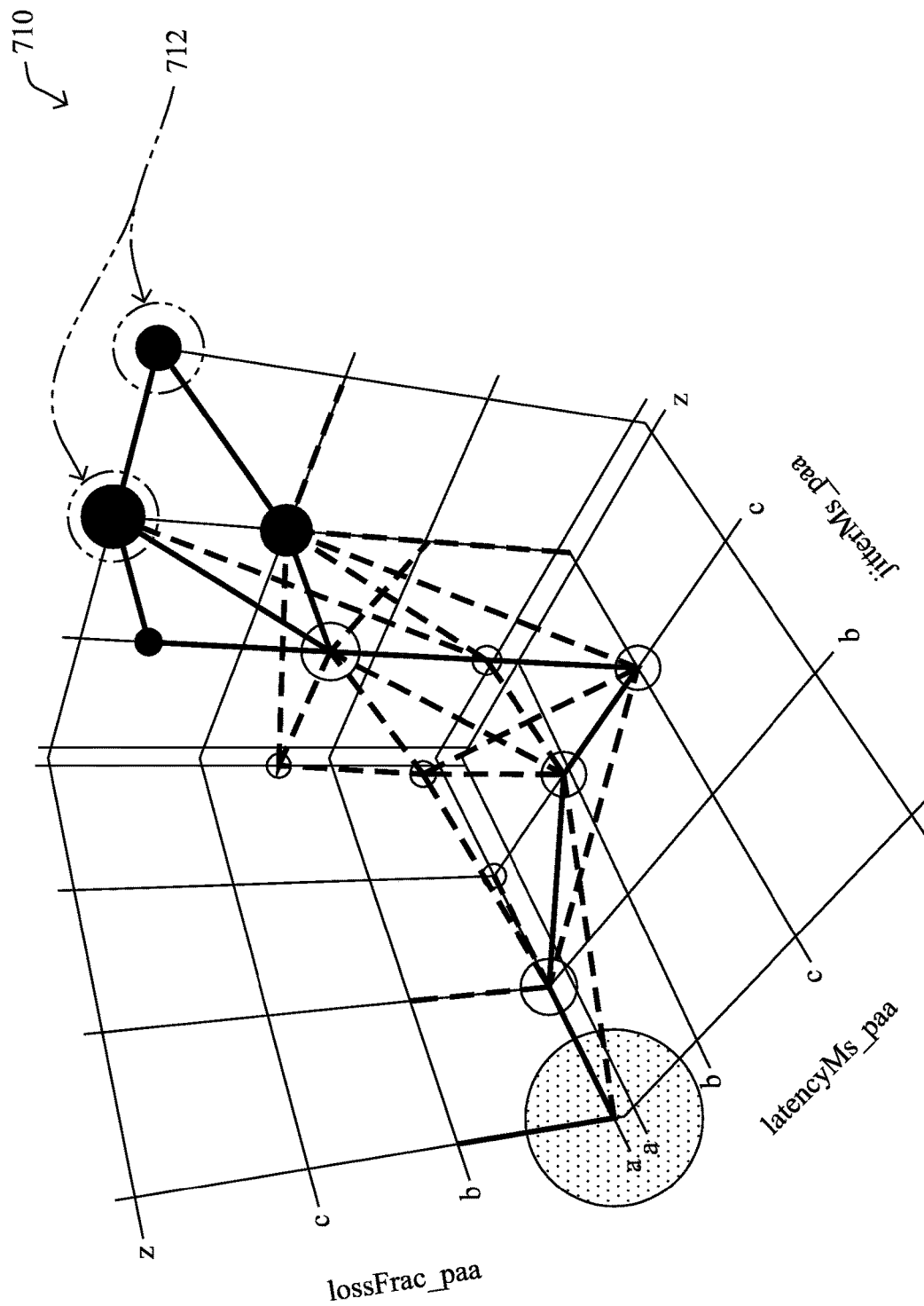

In another embodiment, the state transitions may be visualized using the discrete symbols computed for the path to show a state transition grid. For instance, FIG. 7B illustrates an example state transition grid 710, where the axis of state transition grid 710 represent the loss, latency, and jitter, respectively. Dashed lines between points in state transition grid 710 represent transitions between the states and solid lines indicate a greater number of transitions observed between those states. Here, the states at or near the origin (e.g., the 'aaaa' state) are considered OK. Points representing states having at least one 'c' symbol are considered hints as to the state transitions that are 'bad.' For instance, states/points 712 shown include 'z' values, meaning that there are SLA violations at these states.

In various embodiments, different colorations or other indicia can be used to represent these different types of states and state transitions, such as by coloring 'bad' states red, states with at least 'c' value yellow, etc. This color coding can be set according to the user preference and potentially using different approaches per online application under scrutiny. In addition, different indicia could be used for the various lines between states, to indicate how often the state transition occurs (e.g., by using dashed vs. solid lines, by using more opaque lines, by using thicker vs. thinner lines, etc.).

In the particular example shown in FIG. 7B, it can be seen that most of the SLA violations occur when jitter is in a 'z' state, few violations when latency is in a 'z' state, and very few occur when the loss is in a 'z' state. In addition, other than the all-good state of 'aaaa,' the path spends significant time in the jitter-violated state. Further, most transitions to SLA violations come from the 'c' state of jitter. It is also interesting to see that most of the time the state transitions to an SLA violation by at least one of the variables come from a state which has a 'b' or 'c' in at-least one variable (mostly jitter or latency). This indicates that there are early signs than can be used for predicting SLA violation. Indeed, it can be seen in FIG. 7B that the jitter or latency often goes from low to medium/high, before transitioning to an SLA violated state.

Figure 8A:
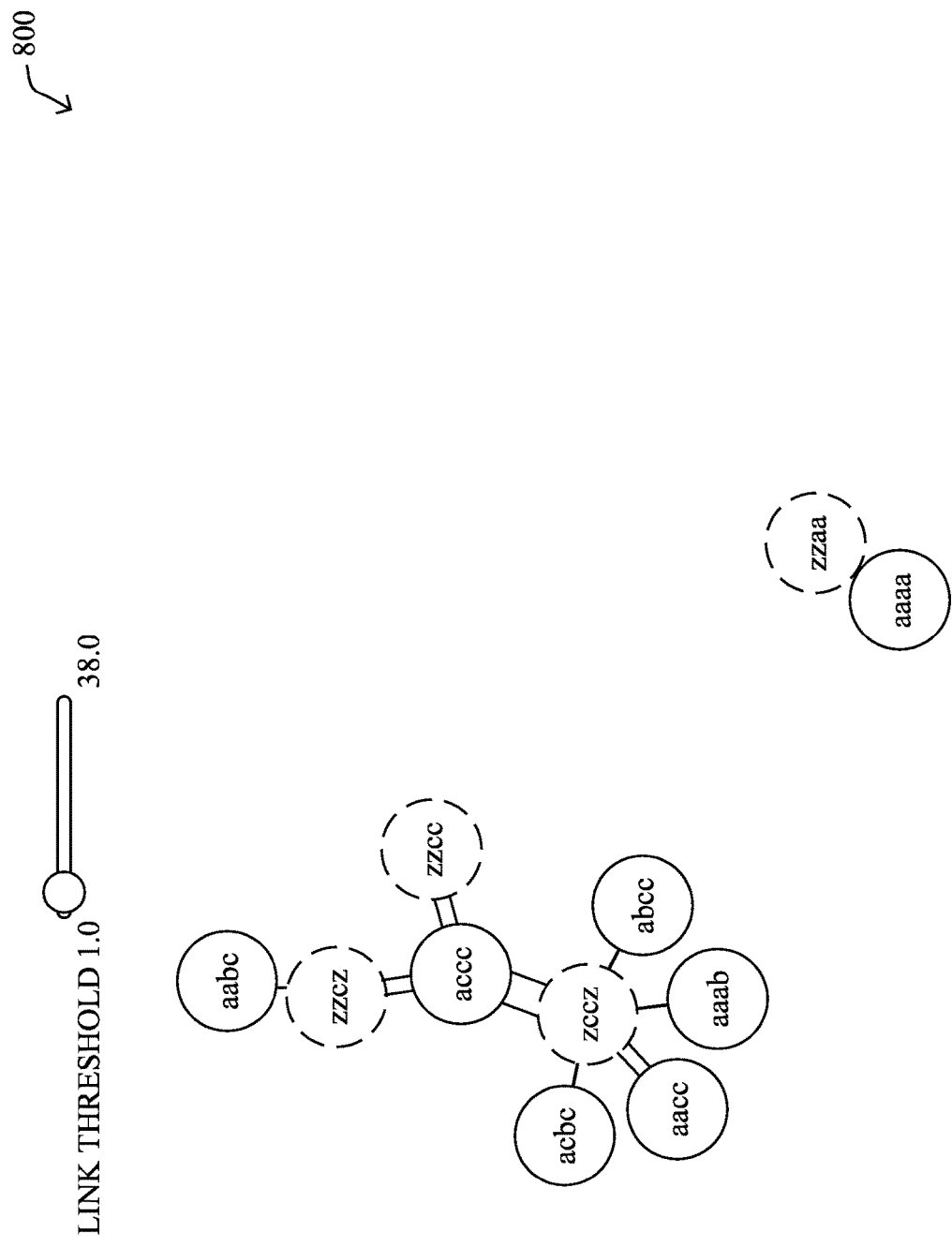
FIGS. 8A-8B illustrate example graphical user interfaces (GUI)s showing state transitions.

Other forms of graphical representations can also be used for the state-transition graphs. For instance, FIG. 8A illustrates an example GUI 800 showing a graph of states and their transitions. More specifically, GUI 800 shows a graph where each node is one-state (with names of state inside the nodes), and the thickness of the edge indicates the number of transitions between the states. The user can interact with the graph by setting the threshold (denoted "link threshold") which shows only links where the number of transitions is greater than a certain number, as illustrated in updated GUI

Figure 8B:
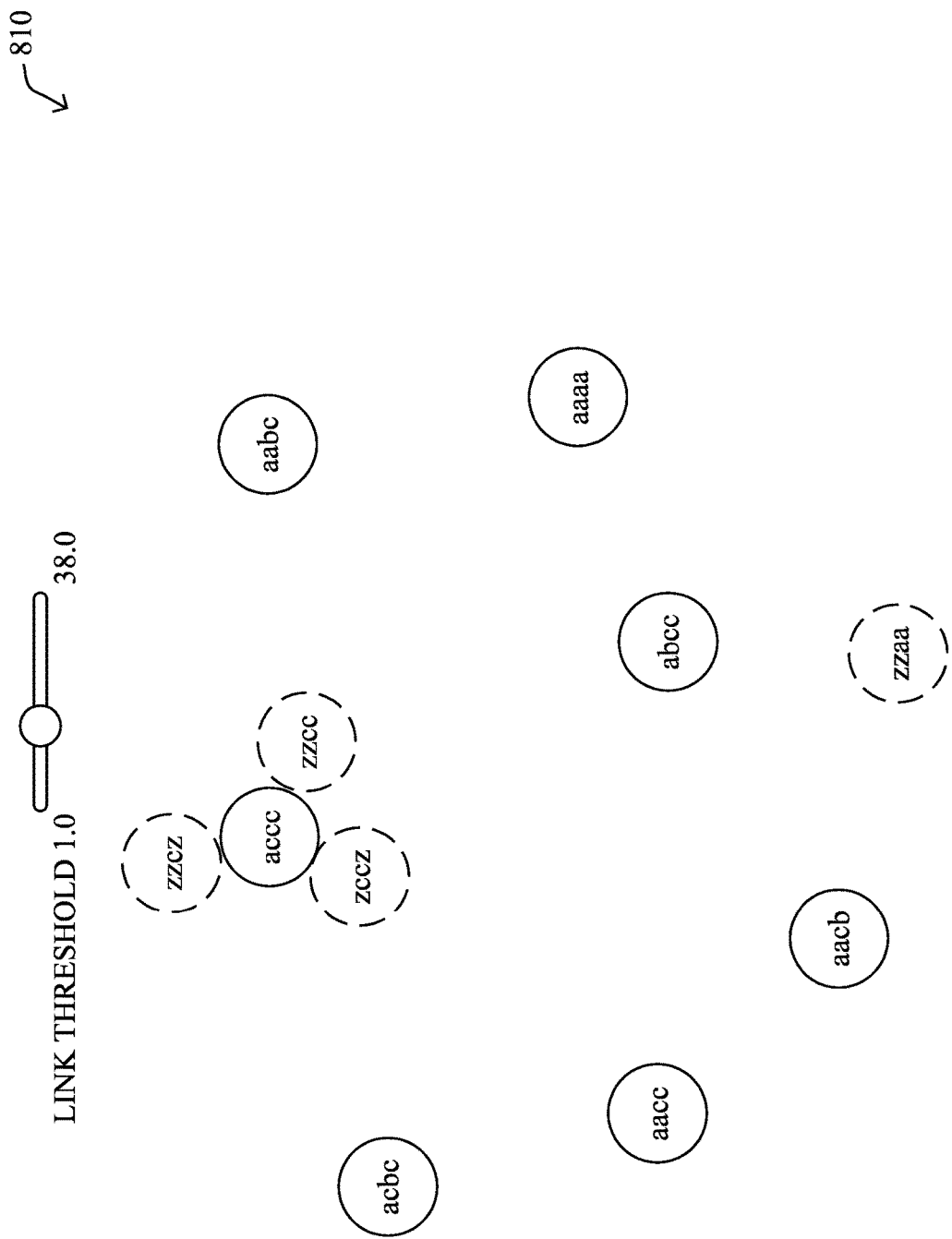

810 in FIG. 8B. A force-directed layout can also be applied to the graph (using, say, a spring layout), that readjusts the node position to best show the interactions.

Referring again to FIG. 5, another potential form of visualization that state transition tracker 506 may provide via user interface module 510 is to represent the state transitions as a trajectory. For instance, state transition tracker 506 may compute a moving window of n-state transitions to represent a trajectory of states taken by a path. For example, a 6-state trajectory [aaaa→aaaa→aaab→abab→accc→zccz], represents one instance of how the path went from all-good state to an SLA violation state via the early sign stages where jitter and latency get worse. An aggregation of all such n-state windows can be represented using a Parallel category diagram or a Sankey diagram, in various embodiments.

Figure 9:
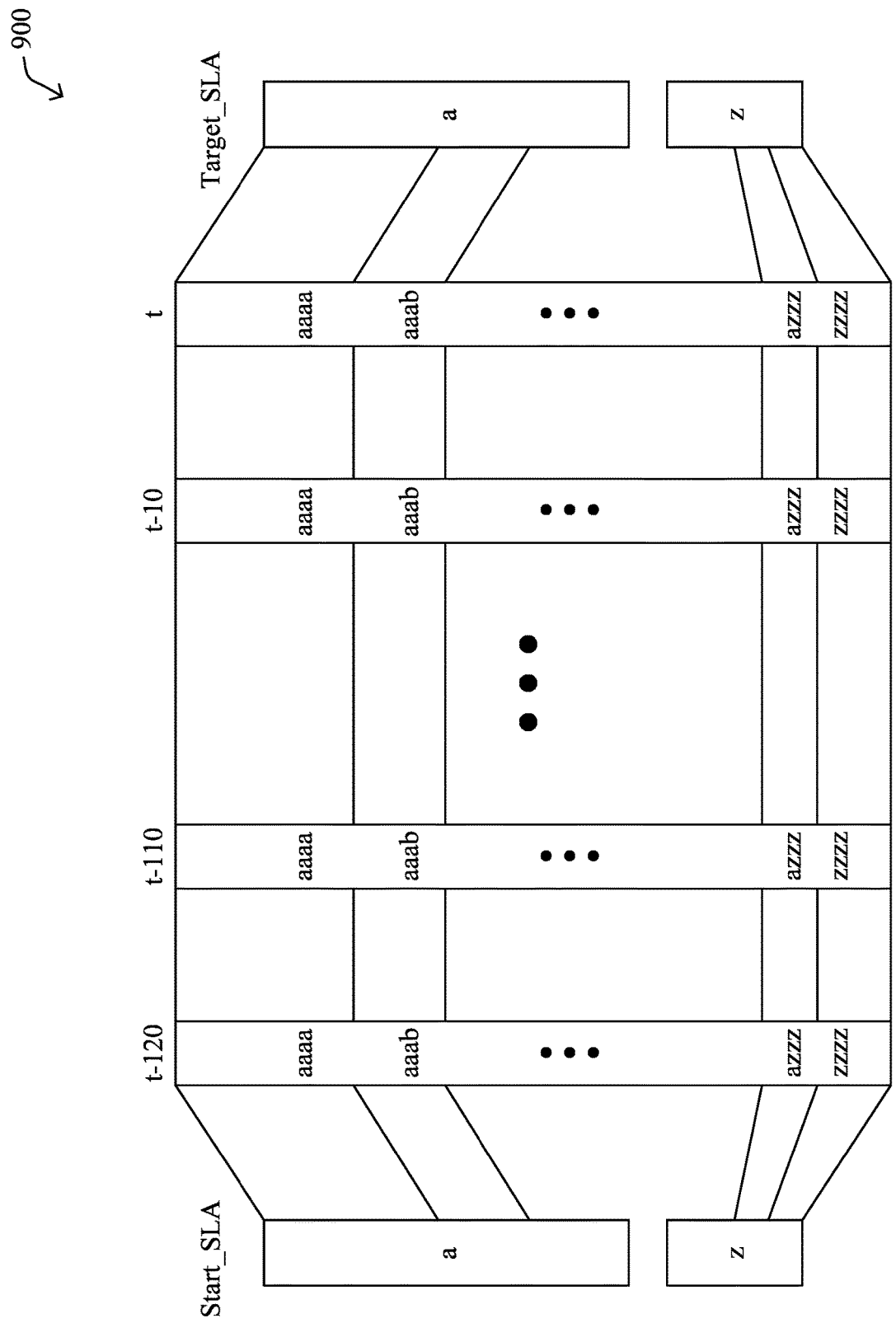
FIG. 9 illustrates an example trajectory graph.

By way of example, FIG. 9 illustrates an example simplified trajectory graph 900, according to various embodiments. As shown, trajectory graph 900 may include a plurality of bars that represent discrete periods of time. For instance, the first and last bars of such a visualization may indicate the start state at time t-120 and the final state, which may typically be an SLA violation. Along each vertical bar may also be a listing of the different possible states for the various parameters. Thus, trajectories between such states can be depicted using lines or other indicia between the state labels, to show the different state transitions.

In addition, the user may be able to select a given state label on 900/, thereby highlighting the state transitions associated with that label. For instance, the user may be able to select the 'z' label at the detected SLA violation (e.g., indicating at least one 'z' symbol exists in the state), to highlight the transitions leading up to that label. This allows the user to visually assess the state transitions/trajectories leading up to the SLA violations. By way of example, a prototype implementation of trajectory graph 900 using data from a live network showed that many early signs are present before an SLA violation state is reached, with at least one parameter hitting 'b' or 'c' (e.g., the 'hint' states) for most paths. All except three out of 193 trajectories exhibited a complete lack of an 'aaaa' state (e.g., an 'all good' state) for up to t-60 minutes, beforehand. In other words, only a very small number of trajectories exhibited no early warning signs of an SLA violation. This insight is extremely valuable for the users and the routing engine, serving as strong evidence that a predictive routing engine can forecast failures up to approximately one hour beforehand.

Regardless of the type of visualizations generated by state transition tracker 506 and provided for display by user interface module 510 (e.g., 3D diagrams, state-transition grids, trajectory graphs, etc.), an administrator will now be able to view and inspect the network states leading up to SLA violations or other undesirable states. In addition, this type of information can also be provided to a predictive routing engine (e.g., predictive application aware routing engine 412), to know which features have the greatest predictive power for failures, as well as a sense as to when they become early warning signs.

In some embodiments, path analysis process 249 may further include application-driven observability engine 508, which is responsible for aggregating paths with the most prominent signals and provide insight to the user via user interface module 510, as required to troubleshoot at a network level for different applications. In one embodiment, for each application, application-driven observability engine 508 may show: a.) how many tunnels often enter a 'bad' state for a given application, and/or b.) the most common early signs leading up to the bad state. Application-driven observability engine 508 may also categorize paths that behave in a similar pattern. For example, application-driven observability engine 508 may extract the information from the state-transition grid as an adjacency matrix where rows represent the starting state, columns represent the ending state, and each cell (i,j) represents the fraction of transitions that between states-i and states-j. This matrix can be vectorized as a Id array and this vector is the summary for one path. Such vectors for paths can then be clustered by application-driven observability engine 508 using traditional clustering algorithms to find out the most similar paths, in some embodiments.

In various other embodiments, application-driven observability engine 508 may cluster the n-state trajectory across the paths using a trajectory clustering algorithm or time-series motif mining, and paths having similar motifs can be clustered together.

Finally, path analysis process 249 may include user interface module 510, which is responsible for providing visualization data to one or more displays for presentation to a network administrator or other interested user. For instance, user interface module 510 may provide any of the visualizations generated by state transition tracker 506 and/or application-driven observability engine 508 in an interactive manner to a display, to allow the user to review the state transitions and trajectories. In further embodiments, as noted, such information can also be provided to a predictive routing engine, to be used to make future path predictions.

Figure 10:
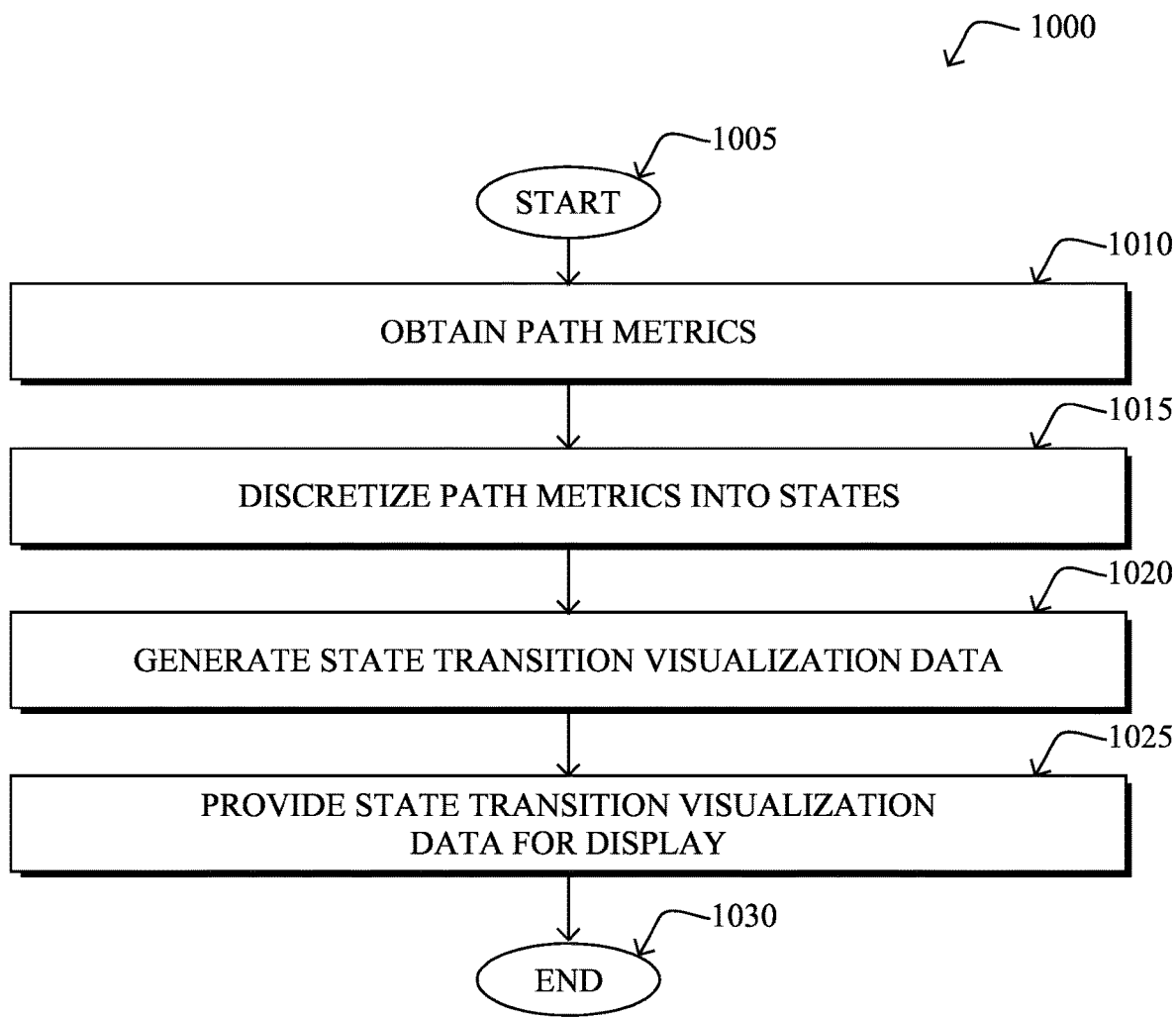
FIG. 10 illustrates an example simplified procedure for providing a state transition visualization for display.

FIG. 10 illustrates an example simplified procedure 1000 (e.g., a method) procedure for providing a state transition visualization for display, in accordance with one or more embodiments described herein. For example, a non-generic, specifically configured device (e.g., device 200), such as controller for a network (e.g., an SDN controller or other device in communication therewith), may perform procedure 1000 by executing stored instructions (e.g., path analysis process 249), to provide a supervisory service to a network. The procedure 1000 may start at step 1005, and continues to step 1010, where, as described in greater detail above, the device may obtain path metrics for a network path used to convey application for an online application, such as an SaaS application. Such path metrics may include, for instance, measured packet loss, delay, jitter, throughput, or the like, for the path over time. In some cases, the path metrics may also include predictions made by a predictive routing engine about the path, such as the probability of the path violating an SLA.

At step 1010, as detailed above, the device may discretize the path metrics into labeled states. To do so, in some embodiments, the device may assign labels to ranges of values for the path metrics, wherein at least one possible label for each of the path metrics represents a service level agreement violation. For instance, the device may assign the label 'a' to a measured jitter less than 10 ms, the label 'b' to a measured jitter between 10-20 ms, etc. In some cases, there may be at least one possible label for each path metric that represents an SLA violation (e.g., jitter>50 ms, etc.). In some embodiments, the device may also discretize the path metrics by dividing timeseries of the path metrics into discrete time periods. In doing so, each state of the path may have an associated time period, allowing the device to assess how the states of the path transition over time.

At step 1020, the device may generate state transition visualization data that represents the labeled states as nodes and transitions between the labeled states as edges connecting the nodes, as described in greater detail above. In some embodiments, the visualization data may comprise a 3D plot having three axis representing three different path metrics, such as the plots shown previously in FIGS. 7A-7B. In other embodiments, the visualization data may comprise a Sankey or Parallel Categories diagram showing trajectories of state transitions by the network path. In further embodiments, the edges in the state transition visualization data may include indicia indicating a count of their corresponding state transitions observed for the network path (e.g., a line weighting, a coloration, etc.).

At step 1025, as detailed above, the device may provide the visualization data for display. For instance, the device may send the visualization data to an electronic display, either locally or via a network connection. Doing so allows a user to review the state transitions of the path leading up to problems with the path, such as SLA violations or decreased user experience metrics. In some embodiments, the device may also provide state transition data based on the labeled states to a predictive routing engine. This allows the predictive routing engine to use the state transition data to predict violations along the network path. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide the use of discretized state-transitions to explain and troubleshoot application experience degradation, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, path metrics for a network path used to convey application traffic for an online application;
   discretizing, by the device, the path metrics into labeled states;
   generating, by the device, state transition visualization data that represents the labeled states as nodes and transitions between the labeled states as edges connecting the nodes; and
   providing, by the device, the state transition visualization data for display, wherein the state transition visualization data being displayed comprises a 3-Dimensional plot with a plurality of nodes, each of which representing one of the labeled states, a plurality of edges, each of which representing one of the transitions between the labeled states, and an indication of which nodes among the plurality of nodes represents a service level agreement violation, wherein axes of the 3-Dimensional plot comprise one or more of packet loss, delay, jitter, or throughput.

2. The method as in claim 1, wherein the path metrics comprise at least one of: packet loss, delay, jitter, or throughput.

3. The method as in claim 1, wherein discretizing the path metrics into labeled states comprises:
   assigning labels to ranges of values for the path metrics, wherein at least one possible label for each of the path metrics represents a service level agreement violation.

4. The method as in claim 1, wherein the state transition visualization data comprises a three dimensional (3D) plot having three axis representing three different path metrics.

5. The method as in claim 1, wherein the state transition visualization data comprises a Sankey or Parallel Categories diagram showing trajectories of state transitions by the network path.

6. The method as in claim 1, further comprising:
   providing state transition data based on the labeled states to a predictive routing engine, wherein the predictive routing engine uses the state transition data to predict violations along the network path.

7. The method as in claim 1, wherein discretizing the path metrics into labeled states comprises:
   dividing timeseries of the path metrics into discrete time periods.

8. The method as in claim 1, wherein the path metrics comprise a probability of a service level agreement violation by the network path predicted by a predictive routing engine.

9. The method as in claim 1, wherein the edges in the state transition visualization data include indicia indicating a count of their corresponding state transitions observed for the network path.

10. An apparatus, comprising:
    one or more network interfaces;
    a processor coupled to the one or more network interfaces and configured to execute one or more processes; and
    a memory configured to store a process that is executable by the processor, the process when executed configured to:
       obtain path metrics for a network path used to convey application traffic for an online application;
       discretize the path metrics into labeled states;
       generate state transition visualization data that represents the labeled states as nodes and transitions between the labeled states as edges connecting the nodes; and
       provide the state transition visualization data for display, wherein the state transition visualization data being displayed comprises a 3-Dimensional plot with a plurality of nodes, each of which representing one of the labeled states, a plurality of edges, each of which representing one of the transitions between the labeled states, and an indication of which nodes among the plurality of nodes represents a service level agreement violation, wherein axes of the 3-Dimensional plot comprise one or more of packet loss, delay, jitter, or throughput.

11. The apparatus as in claim 10, wherein the path metrics comprise at least one of: packet loss, delay, jitter, or throughput.

12. The apparatus as in claim 10, wherein the apparatus discretizes the path metrics into labeled states by:
assigning labels to ranges of values for the path metrics, wherein at least one possible label for each of the path metrics represents a service level agreement violation.

13. The apparatus as in claim 10, wherein the state transition visualization data comprises a three dimensional (3D) plot having three axis representing three different path metrics.

14. The apparatus as in claim 10, wherein the state transition visualization data comprises a Sankey or Parallel Categories diagram showing trajectories of state transitions by the network path.

15. The apparatus as in claim 10, wherein the process when executed is further configured to:
provide state transition data based on the labeled states to a predictive routing engine, wherein the predictive routing engine uses the state transition data to predict violations along the network path.

16. The apparatus as in claim 10, wherein the apparatus discretizes the path metrics into labeled states by:
dividing timeseries of the path metrics into discrete time periods.

17. The apparatus as in claim 10, wherein the path metrics comprise a probability of a service level agreement violation by the network path predicted by a predictive routing engine.

18. A tangible, non-transitory, computer-readable medium storing program instructions that cause a device to execute a process comprising:
obtaining, by the device, path metrics for a network path used to convey application traffic for an online application;
discretizing, by the device, the path metrics into labeled states;
generating, by the device, state transition visualization data that represents the labeled states as nodes and transitions between the labeled states as edges connecting the nodes; and
providing, by the device, the state transition visualization data for display, wherein the state transition visualization data being displayed comprises a 3-Dimensional plot with a plurality of nodes, each of which representing one of the labeled states, a plurality of edges, each of which representing one of the transitions between the labeled states, and an indication of which nodes among the plurality of nodes represents a service level agreement violation, wherein axes of the 3-Dimensional plot comprise one or more of packet loss, delay, jitter, or throughput.

* * * * *

UNITED STATES PATENT AND TRADEMARK OFFICE
CERTIFICATE OF CORRECTION

| | |
|---|---|
| PATENT NO. | : 12,095,650 B2 |
| APPLICATION NO. | : 17/382469 |
| DATED | : September 17, 2024 |
| INVENTOR(S) | : Jean-Philippe Vasseur et al. |

Page 1 of 1

It is certified that error appears in the above-identified patent and that said Letters Patent is hereby corrected as shown below:

In the Specification

Column 13, Line 62 please amend as shown:
ms, jitter=0ms and loss=[0,1.5]%, resulting in a very dense Column 16, Line 9 please amend as shown:
torized as a 1d array and this vector is the summary for one Signed and Sealed this
Tenth Day of December, 2024

Katherine Kelly Vidal
*Director of the United States Patent and Trademark Office*